United States Patent
Baumbach et al.

(10) Patent No.: US 7,452,002 B2
(45) Date of Patent: Nov. 18, 2008

(54) INFLATABLE KNEE BOLSTER AIRBAG WITH INTERNAL TETHER

(75) Inventors: Eric J. Baumbach, Sterling Heights, MI (US); Robert L. Arwood, Frasier, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 326 days.

(21) Appl. No.: 11/389,644

(22) Filed: Mar. 27, 2006

(65) Prior Publication Data

US 2007/0222189 A1    Sep. 27, 2007

(51) Int. Cl.
*B60R 21/16* (2006.01)
(52) U.S. Cl. .................................... 280/743.2
(58) Field of Classification Search ............. 280/743.2, 280/730.1, 732, 753
See application file for complete search history.

(56) References Cited

U.S. PATENT DOCUMENTS

| | | | |
|---|---|---|---|
| 3,702,706 A | 11/1972 | Sobkow | |
| 5,464,250 A * | 11/1995 | Sato ........................ | 280/743.1 |
| 5,536,043 A | 7/1996 | Lang et al. | |
| 5,566,977 A | 10/1996 | Wipasuramonton | |
| 5,791,685 A | 8/1998 | Lachat et al. | |
| 6,073,961 A | 6/2000 | Bailey et al. | |
| 6,092,836 A | 7/2000 | Saslecov | |
| 6,237,941 B1 | 5/2001 | Bailey et al. | |
| 6,412,810 B1 | 7/2002 | Wipasuramonton et al. | |
| 6,450,529 B1 | 9/2002 | Kalandek et al. | |
| 6,464,255 B1 | 10/2002 | Preisler et al. | |
| 6,749,220 B1 | 6/2004 | Wipasuramonton et al. | |
| 6,752,417 B2 | 6/2004 | Takimoto et al. | |
| 6,854,759 B2 | 2/2005 | Schwark et al. | |
| 6,902,186 B2 | 6/2005 | Suzuki et al. | |
| 7,152,880 B1 * | 12/2006 | Pang et al. ............... | 280/743.2 |
| 7,222,877 B2 * | 5/2007 | Wipasuramonton et al. ........................ | 280/730.1 |
| 2003/0132617 A1 * | 7/2003 | Takimoto et al. ......... | 280/730.1 |
| 2004/0188988 A1 | 9/2004 | Wipasuramonton et al. | |
| 2005/0212270 A1 | 9/2005 | Wipasuramonton et al. | |
| 2007/0200320 A1 * | 8/2007 | Keshavaraj ............... | 280/730.1 |
| 2007/0246920 A1 * | 10/2007 | Abele et al. ............... | 280/730.1 |

* cited by examiner

*Primary Examiner*—John Q. Nguyen
*Assistant Examiner*—Drew J. Brown
(74) *Attorney, Agent, or Firm*—Lonnie Drayer

(57) ABSTRACT

An airbag module has an airbag with an inflation chamber. The inflation chamber has a first portion and a second portion. The first portion of the inflation chamber is deployed generally along a first axis and the second portion of the inflation chamber is generally deployed along a second axis. The first axis is transverse to the second axis. The first portion of the inflation chamber is defined by a front panel and a back panel. The second portion of the inflation chamber is attached to the back panel. An inflator is in communication with the airbag. A tether is provided in the first portion of the inflation chamber. The tether has three portions. The first portion of the tether extends across the first inflation chamber and is secured to the airbag at a first panel location and a first back panel location. The second portion of the tether extends across the first inflation chamber and is secured to the airbag at the first back panel location and a second front panel location displaced from the first front panel location. The third portion of the tether extends across the first inflation chamber and is secured to the airbag at the second front panel location and a second back panel location displaced from the first back panel location.

6 Claims, 3 Drawing Sheets

INFLATABLE KNEE BOLSTER AIRBAG WITH INTERNAL TETHER

BACKGROUND OF THE INVENTION

This invention relates to an airbag module with an airbag having a tether for guiding the direction of the airbag.

An airbag module typically has an inflatable airbag that serves as a cushion for a vehicle occupant in a crash. The airbag is connected to an airbag inflator, which emits a quickly expanding gas to deploy the airbag when a vehicle's crash detection system has sensed a crash. Airbags are used not only to protect a vehicle occupant from impact with a steering column of a vehicle but also against impact with other hard surfaces of a vehicle occupant compartment. Typically, this protection involves placing airbags to cover such areas as the upper part of a vehicle instrument panel as well as the sides of vehicle doors to protect against upper extremity injuries, such as injuries to the head.

Manufacturers have also used cushioning devices to protect against injuries to the lower extremities of a vehicle occupant, such as knees and legs. In the past, this protection involved adding foam cushioning to the lower portions of the vehicle instrument panel. Recently manufacturers have considered using an active surface that deploys during a crash to create a cushion for the vehicle occupant. A challenge faced in the design of such devices is that a desirable location for deployment of these deploying devices is beneath the instrument panel. Airbags in such locations have a tendency to deploy horizontally toward the vehicle occupant. It has been very difficult to guide the airbag in a vertical direction to cover the front face of the instrument panel.

A need therefore exists for an airbag that is capable of deploying from underneath or lower on the vehicle instrument panel in an upward direction.

SUMMARY OF THE INVENTION

The invention comprises an airbag module for a vehicle. The airbag a single inflation chambers. A first portion of the inflation chamber is expandable in a generally horizontal direction while a second portion of the inflation chamber is expandable in a generally vertical direction. In this way, the inventive airbag module allows the airbag to project upwardly across a vehicle instrument panel.

The airbag has a knee cushion portion and a neck portion. The airbag and inflator are stored in a module housing until deployment. The neck portion extends to the knee cushion portion and is sized so that upon inflation of the neck portion the knee cushion is advanced horizontally far enough away from the housing to cover a face of the instrument panel as the knee cushion portion inflates. The knee cushion portion of the inflation chamber contains a tether that guides the knee cushion portion in an upward direction. The tether zigzags between a front panel and a back panel of the knee cushion. This design assists in the upward deployment of the knee cushion from the neck of the airbag. Furthermore, the knee cushion has a passageway spaced between a sidewall of the knee cushion and the tether. This passageway also serves to direct the knee cushion upward. In this way, the inventive airbag module creates a quickly deploying surface that covers a portion of the vehicle instrument panel that could otherwise lead to injuries of the vehicle occupant's lower extremities.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE INVENTION

Figure 1:
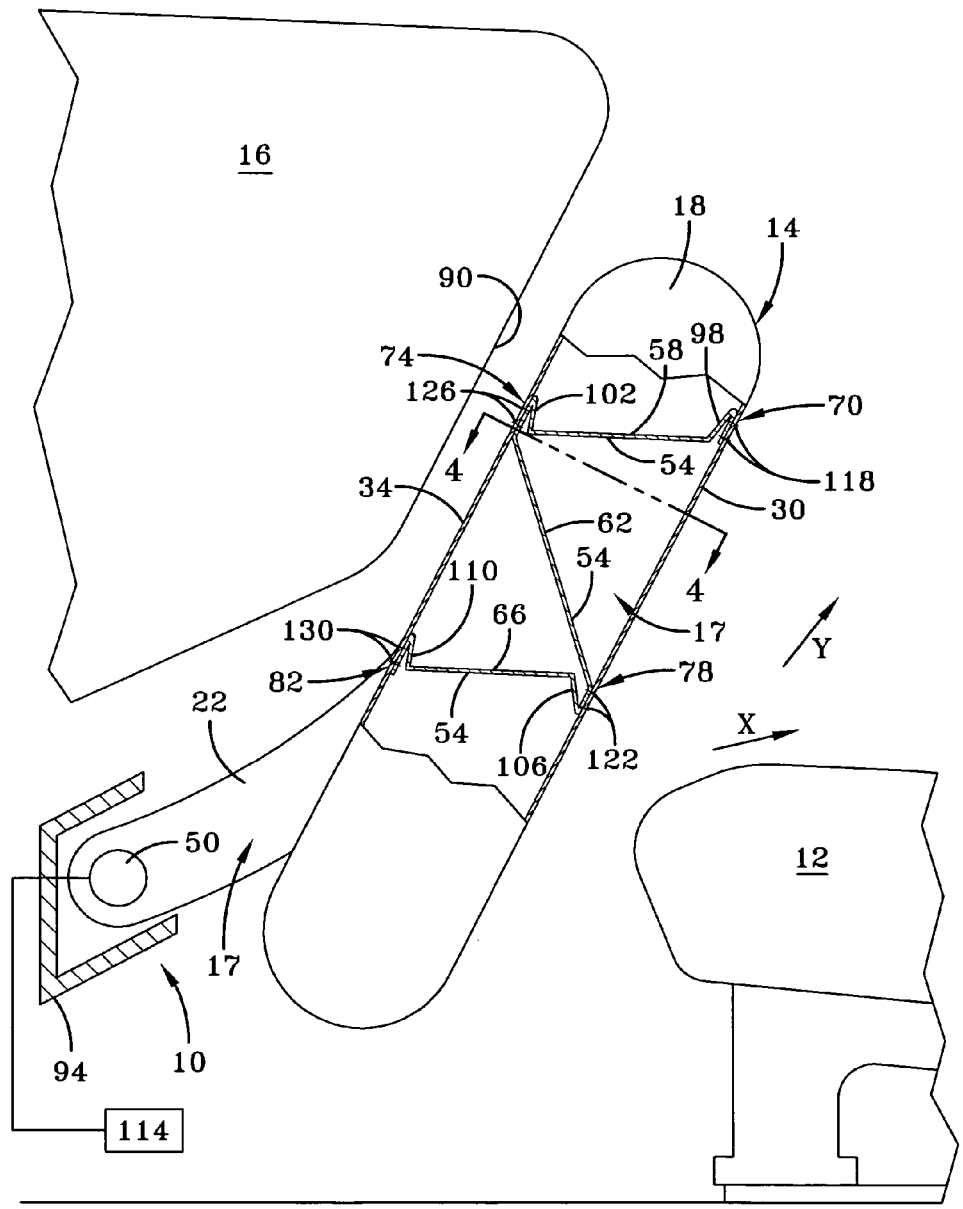
FIG. 1 is a side view of the inventive airbag module with the airbag deployed between a vehicle instrument panel and a vehicle seat.

FIG. 1 illustrates an inventive airbag module 10 with an airbag 14 fully deployed between a vehicle instrument panel 16 and a vehicle seat 12. As shown, in the inflated state the airbag 14 has an inflation chamber 17. A first portion 18 of the inflation chamber 17 that serves as a knee cushion for a vehicle occupant sitting in the seat 12 in the event of a crash. A second portion 22 of the inflation chamber 17 forms a neck that is attached to the back panel 34 of the first portion 18 of the inflation chamber 18 that serves as a knee cushion. The first portion 18 of the inflation chamber and the second portion 22 of the inflation chamber are in communication with an inflator 50 that is linked to a crash detection system 114 that controls deployment of the airbag 14 through known techniques. The inflator 50 can be a pyrotechnic inflator, a stored gas inflator or a hybrid inflator, all of which are well known to those of ordinary skill in the art. The airbag module comprises the airbag 14 and inflator 50 are stored in a module housing 94 until deployment.

Figure 2:
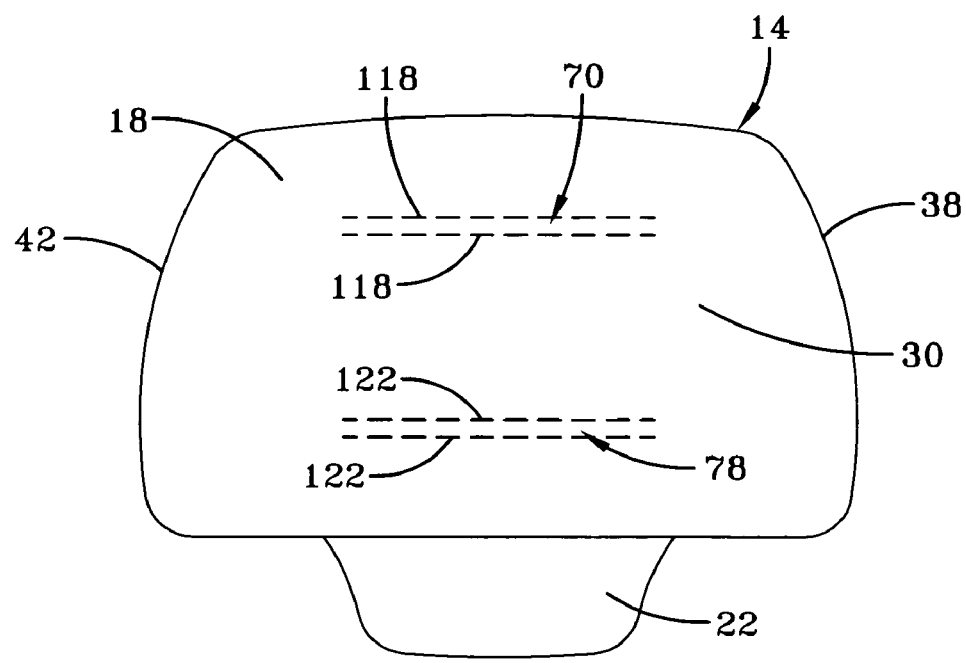
FIG. 2 is a front view of the airbag of FIG. 1 highlighting sewn locations of the internal tether on a front panel of the airbag.
Figure 3:
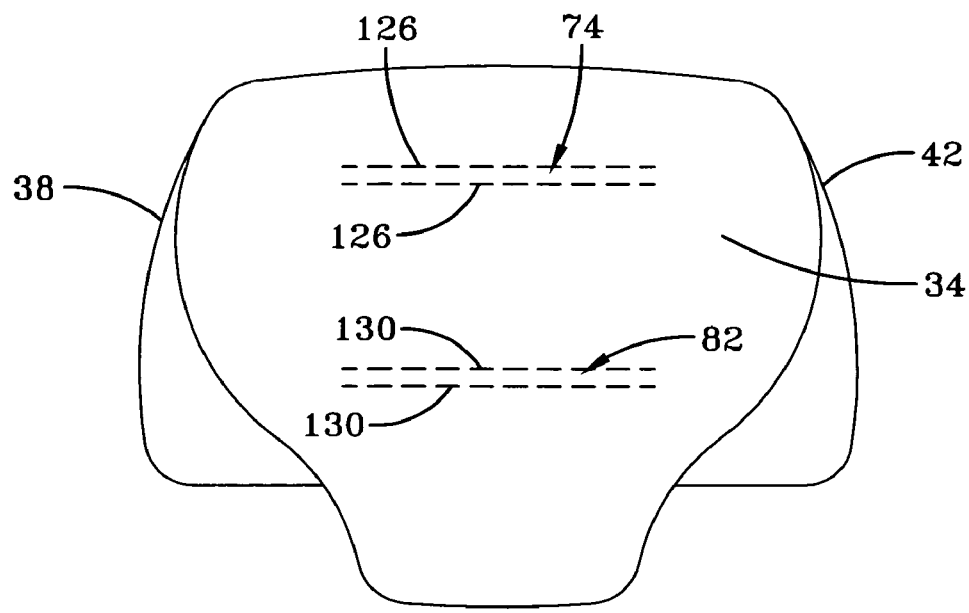
FIG. 3 is a back view of the airbag of FIG. 2 highlighting sewn locations of the internal tether on the back panel of the airbag.
Figure 4:
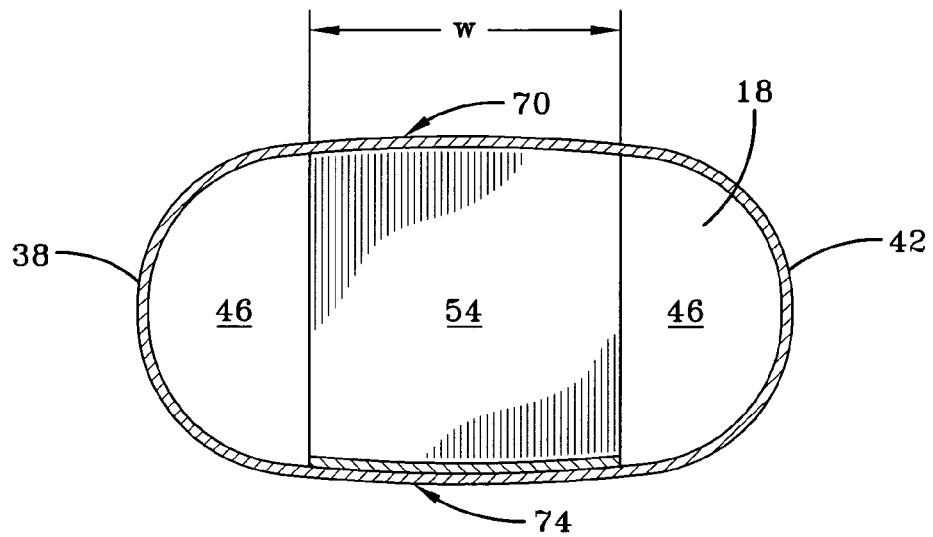
FIG. 4 is a cross-sectional view of the airbag of FIGS. 1-3, taken at line 4-4 of FIG. 1, showing passageways between the internal tether and side panels of the airbag.

As shown the first portion 18 of the inflation chamber deploys in a direction indicated by arrow Y that is closer to being truly vertical than the second portion 22 of the inflation chamber which deploys in a direction indicated by arrow X that is closer to being truly horizontal than the first portion 18 of the inflation chamber. The geometry selected for the positioning of the deployed airbag is of course dependent upon the configuration of the vehicle in which the airbag is installed. Hence, the second portion 22 of the inflation chamber permits the first portion 18 of the inflation chamber to be placed horizontally in front of the vehicle instrument panel 16 when fully inflated as shown. The first portion 18 of the inflation chamber, here a knee cushion, has a front panel 30, a back panel 34, a first side panel 38 (as shown in FIGS. 2-4) and a second side panel 42 (as shown in FIGS. 2-4). As used herein and in the claims "front" refers to a direction facing the seat 12 of a vehicle which can receive a vehicle occupant, and "back" refers to a direction facing away from the to seat 12 of a vehicle which can receive a vehicle occupant when the airbag is deployed. Disposed within the first portion 18 of the inflation chamber is a tether 54, here a sheet of fabric as shown in FIG. 4. The tether 54 comprises a first portion 58 of the tether, a second portion 62 of the tether, and a third portion 66 of the tether. When the first portion 18 of the inflation chamber is fully deployed the first portion 58 of the tether extends generally parallel to the third portion 66 of the tether, while the second portion 62 of the tether is oriented transverse to both the first portion 58 of the tether and the third portion 66 of the tether.

The first portion 58 of the tether 54 is secured by sewn stitches 118 attaching a first fold 98 of the tether 54 to a first front panel location 70 on the front panel 30 of the first portion 18 of the inflation chamber. The first portion 58 of the tether is also secured by sewn stitches 126 attaching a second fold 102 of the tether to a first back panel location 74 of the back panel 34 of the first portion 18 of the inflation chamber. The tether 54 is disposed across the first portion 18 of the inflation chamber along a diagonal relative to the first portion 58 of the tether. One end of the second portion 62 of the tether is sewn to the first back panel location 74 at the second fold 102 as indicated, and is secured by sewn stitches 122 attaching a third fold 106 of the tether 54 to a second front panel location 78 on the front panel 30 of the first portion 18 of the inflation chamber. The second front panel location 78 is vertically displaced from the first front panel location 70 as shown. One end of the third portion 66 of the tether is sewn to the second front back panel location 78 at the third fold 106 as indicated, and is secured by sewn stitches 130 attaching a fourth fold 110 of the tether 54 to a second back panel location 82 on the back panel 34 of the first portion 18 of the inflation chamber, which is vertically displaced from the first back panel location 74. While the means for attaching the tether to the front and back panels of the airbag is shown in this embodiment as sewing, it is understood that the means for attaching the tether to the front and back panels of the airbag may be any suitable means for attaching one piece of sheet material or fabric to another may be employed including but not limited to stitching, sewing, knitting, hot and cold applied adhesives, welding, heat staking and fasteners. This unique design of the tether 54 serves to guide the first portion 18 of the inflation chamber over the face 90 of the vehicle instrument panel 16 in an upward direction in the direction indicated by arrow Y.

FIG. 2 is a front view of the airbag 14. The two lines of stitches 118 are provided to secure a first fold 98 of the tether at a first front panel location 70 to secure the first portion 58 of the tether to the front panel 30. The first portion 58 of the tether and the second portion 62 of the tether are both secured by stitches 126 on the second fold 102 of the tether to the back panel 34 as shown in FIG. 3. The second portion 62 of the tether is and the third portion 66 of the tether are both attached by stitches 122 attaching third fold 106 of the tether to the front panel 30 at a second front panel location 78 as shown in FIG. 2. The third portion 66 of the tether is further attached by stitches 130 attaching the fourth fold 110 of the tether of the to the back panel 34 as shown in FIG. 3. Preferably, as shown, the stitches 118, 122, 126 and 130 extend across the width W of the tether 54.

FIG. 4 is a cross-sectional view of the airbag of FIGS. 1-3, taken at line 4-4 of FIG. 1. As shown in FIG. 4, the width W of the tether 54 is smaller than the width of the first portion 18 of the inflation chamber. Accordingly, passageways 46 are formed between a first side panel 38 and the tether 54 as well as between a second side panel 42 and the tether 54. The passageways 46 permit inflation gas to assist in the upper deployment of the first portion 18 of the inflation chamber.

Figure 5:
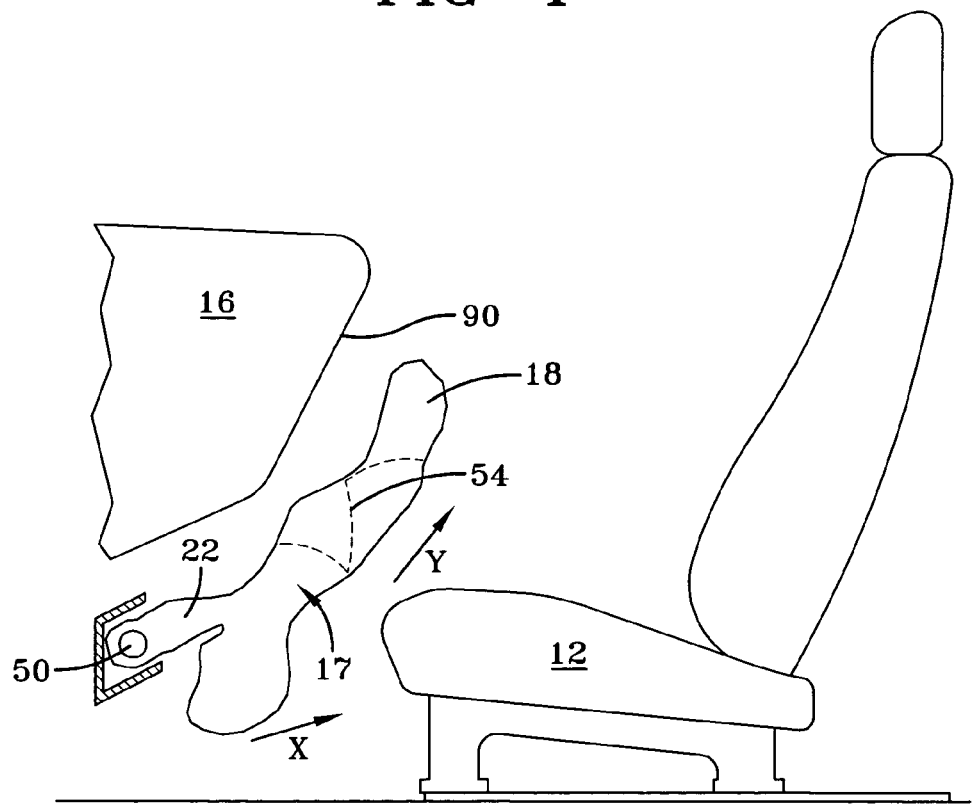
FIG. 5 illustrates the airbag deploying from its housing.

As shown in FIG. 5, with the unique design of the airbag 14, upon deployment the airbag module 10 releases inflation gas from the inflator 50 into the second portion 22 of the inflation chamber, which inflates to extend the airbag 14 in the direction indicated by arrow X as shown in FIG. 5. Inflation gas also transfers from the second portion 22 of the inflation chamber to the first portion 18 of the inflation chamber. Due to the passageways 46 and tether 54, the first airbag 18 expands upwardly in the direction indicated by arrow Y to thereby form a protective barrier for a vehicle occupant sitting in the seat 12 against the face 90 of the vehicle instrument panel 16.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An airbag module comprising:
a module housing containing an airbag and an inflator;
the airbag having an inflation chamber comprising a first portion of the inflation chamber and a second portion of the inflation chamber, the first portion of the inflation chamber is deployable in first direction and the second portion of the inflation chamber is deployable in a second direction, the first direction being transverse to the second directions, the first portion of the inflation chamber defined by a front panel and a back panel and the second portion of the inflation chamber extending from the back panel;
the inflator in communication with the airbag;
a tether for directing the deployment of the airbag, the tether comprising a first portion of the tether, a second portion of the tether, and a third portion of the tether;
the first portion of the tether is secured by sewn stitches attaching a first fold of the tether to a first front panel location on the front panel of the first portion of the inflation chamber, the first portion of the tether is also secured by sewn stitches attaching a second fold of the tether to a first back panel location of the back panel of the first portion of the inflation chamber;
an end of the second portion of the tether is secured by sewn stitches to the first back panel location at the second fold of the tether, and the second portion of the tether is also secured by sewn stitches attaching a third fold of the tether to a second front panel location on the front panel of the first portion of the inflation chamber;
and end of the third portion of the tether is secured by sewn stitches to the second front back panel location at the third fold of the tether, and the third portion of the tether is also secured by sewn stitches attaching a fourth fold of the tether to a second back panel location on the back panel of the first portion of the inflation chamber.

2. The airbag module of claim 1 wherein the first portion of the tether is generally parallel to the third portion of the tether when the airbag is deployed.

3. The airbag module of claim 2 wherein the second portion of the tether extends transversely between the first portion of the tether and the third portion of the tether when the airbag is deployed.

4. The airbag module of claim 1 wherein the inflator is disposed in the second portion of the inflation chamber.

5. The airbag module of claim 1 wherein the second portion of the inflation chamber is sized to extend across an underside of a vehicle instrument panel and the first portion of the inflation chamber is deployed upward from the second portion of the inflation chamber proximate to the vehicle instrument panel.

6. The airbag module of claim 1 wherein the first portion of the inflation chamber has a first side panel and a second side panel, the first side panel and the second side panel extending between the front panel and the back panel, wherein at least one passageway is formed between the tether and at least one of the first side panel and the second side panel, the passageways configured to permit air from the inflator to deploy upward.

* * * * *